(12) United States Patent
Onizuka (10) Patent No.: US 8,665,678 B2
(45) Date of Patent: Mar. 4, 2014

(54) REPRODUCING DEVICE AND REPRODUCING METHOD

(75) Inventor: Kazuhiro Onizuka, Kanagawa (JP)

(73) Assignee: D&M Holdings, Inc., Kanagawa (JP)

( * ) Notice: Subject to any disclaimer, the term of this patent is extended or adjusted under 35 U.S.C. 154(b) by 0 days.

(21) Appl. No.: 12/934,805

(22) PCT Filed: Sep. 29, 2008

(86) PCT No.: PCT/JP2008/067607
§ 371 (c)(1),
(2), (4) Date: Sep. 27, 2010

(87) PCT Pub. No.: WO2009/118931
PCT Pub. Date: Oct. 1, 2009

(65) Prior Publication Data
US 2011/0026380 A1    Feb. 3, 2011

(30) Foreign Application Priority Data
Mar. 27, 2008 (JP) .................. 2008-082380

(51) Int. Cl.
*G11B 23/00* (2006.01)
(52) U.S. Cl.
USPC ............... 369/30.36; 369/271.1; 369/190; 369/52.1; 369/264; 369/53.2; 369/53.37
(58) Field of Classification Search
USPC ............ 369/30.04, 30.03, 30.01, 283, 280, 369/30.27, 30.19, 30.26, 47.32, 47.1, 47.28, 369/53.31, 270.1, 271.1, 264, 191.1, 221, 369/181, 183, 188, 30.94, 30.97, 37.75, 369/75.21, 30.7, 127, 30.06, 231, 30.48, 369/126; 360/98.06, 98.08, 99.02, 99.05, 360/99.12, 99.15
See application file for complete search history.

(56) References Cited

U.S. PATENT DOCUMENTS 5,406,843 A * 4/1995 Hannan et al. ............. 73/304 C
5,554,976 A * 9/1996 Miyauchi et al. ............ 340/626
5,756,876 A * 5/1998 Wetzel et al. ................ 73/1.73
(Continued)

FOREIGN PATENT DOCUMENTS

EP    2085996       8/2009
JP    1992-258423   9/1992
(Continued)

OTHER PUBLICATIONS

Abstract for Japanese Patent Publication No. 2005-190633.*

*Primary Examiner* — Wayne Young
*Assistant Examiner* — Dionne Pendleton
(74) *Attorney, Agent, or Firm* — Peter A. Nieves; Sheehan Phinney Bass + Green PA (57) ABSTRACT

A reproduction device, contains a rotatable operation disk part for performing an input related to reading of data stored in a memory and a capacitance sensor section for outputting a sensor value expressing a change of a capacitance according to depression of the rotatable operation disk part. The device also contains a storage part for storing a reference value corresponding to the sensor value obtained while the rotatable operation disk part is not depressed, and a control part for judging presence/absence of pressing on the rotatable operation disk part based on a vector quantity being a relative value obtained from a difference between the sensor value output from the capacitance sensor section and the reference value stored in the storage part.

12 Claims, 6 Drawing Sheets

(56) References Cited

U.S. PATENT DOCUMENTS

| | | | |
|---|---|---|---|
| 7,075,527 B2* | 7/2006 | Takagi et al. | 345/184 |
| 2002/0176327 A1 | 11/2002 | Yamada et al. | |
| 2004/0196257 A1 | 10/2004 | Sato et al. | |
| 2004/0239328 A1* | 12/2004 | Yamagishi | 324/326 |
| 2006/0283651 A1* | 12/2006 | Fultz et al. | 180/272 |
| 2007/0057922 A1* | 3/2007 | Schultz et al. | 345/173 |
| 2009/0073140 A1* | 3/2009 | Fujita et al. | 345/174 |
| 2009/0232322 A1* | 9/2009 | Tseng et al. | 381/67 |
| 2010/0013768 A1* | 1/2010 | Leung | 345/163 |
| 2010/0080109 A1* | 4/2010 | Flum et al. | 369/264 |

FOREIGN PATENT DOCUMENTS

| | | |
|---|---|---|
| JP | 1995-200164 | 8/1995 |
| JP | 10240255 | 9/1998 |
| JP | 2001-264194 | 9/2001 |
| JP | 2002-352513 | 12/2002 |
| JP | 2004-212124 | 7/2004 |

* cited by examiner

REPRODUCING DEVICE AND REPRODUCING METHOD

TECHNICAL FIELD

The present invention relates to a technology for a reproduction device that can reproduce stored digital data freely.

BACKGROUND ART

A reproduction device, which is used in a disco club or the like by an operator such as a disk jockey, has, as an operating means for cueing or a scratch reproduction, a disk-like controller that can be operated to rotate. This reproduction device detects a rotation direction, a rotation speed, and a rotation variation of the controller and whether or not the controller is operated by the operator. Then, it performs a special reproduction according to the detected operation, such as a scratch reproduction (see, for example, Japanese Patent Application Laid-open No. 2002-343026 (Paragraph "0082" and the like) and Japanese Patent Application Laid-open No. 2005-190633).

In configuration for detecting pressing on the controller performed by the operator, a plurality of switches are usually disposed on a circle below an outer rim of the controller (see, for example, Japanese Patent Application Laid-open No. 2005-190633). When the operator operates the controller, the controller moves downward and presses the switch so that the pressing is detected. As the switch, a mechanical switch or a membrane switch is used.

In addition, Japanese Patent Application Laid-open No. 2002-343026 discloses a structure in which a pressure sensing layer made of a dielectric material is provided to a casing, whereby the pressure sensing layer senses pressing on an outer rim of the controller.

Further, Japanese Patent Application Laid-open No. 2002-343026 describes that a capacitance sensor may be used for detecting a variation in capacitance, though it does not disclose any concretization thereof.

However, those conventional pressing detection methods using the controller may have the following disadvantages. First, if the switch is used for the detection, there may be a difference of operational touch feeling between a part where the switch is disposed and a part where the switch is not disposed or an uncomfortable operation feeling due to a stroke (distance between the controller and the switch) and a click feeling. In addition, age deterioration due to physical contacts is apt to occur, so that there is a fear that detection accuracy cannot be maintained. Further, the structure including the switch causes an increase in cost for manufacturing, for example, a die.

Next, if the pressure sensing layer is used for the detection, the pressure sensing layer and the controller always contact with each other via a sheet. As a result, significant deterioration by friction or the like occurs so that there is a problem that detection of high accuracy cannot be maintained, or the like. Therefore, it is not practical. In addition, similarly to the case of using the switch, there is a restriction in designing the entire apparatus because the pressing is detected by a positional relationship between the controller and the casing.

From this viewpoint, it is desirable to apply a capacitance sensor (see, for example, Japanese Patent Application Laid-open No. Hei 11-258090) to the controller so that the controller itself can detect the pressing, because the age deterioration due to the physical contacts hardly occurs. In addition, flexibility in the designing may increase, and the manufacturing cost is low.

DISCLOSURE OF THE INVENTION

Here, the capacitance sensor is usually used for a switch for controlling turning on and off a light fixture, or the like, and it is not required to have such high accuracy of the pressing detection. However, the reproduction device used by a disk jockey or the like performs in real time and by each beat, for example, processings such as switching audio processing and stopping the audio in accordance with whether or not the controller is pressed. Therefore, the pressing detection means used for the controller of the reproduction device is required to have high accuracy of the pressing detection.

However, if the capacitance sensor is simply applied to the controller, a detection error may occur due to an influence of fluctuation in capacitance when a person approaches, external noise, and the like. Japanese Patent Application Laid-open No. 2002-343026 does not disclose anything about this problem that occurs when the capacitance detection is performed. As described above, it is conventionally required to make practicable a controller that can detect a variation in capacitance so as to detect pressing on the controller performed by the operator with high accuracy and a reproduction device provided with the controller. It is an object of the present invention to solve the problems in the conventional technologies described above.

In order to attain the above-mentioned object, a reproduction device according to a first aspect of the present invention includes:

a rotatable operation disk part for performing an input related to reading of data stored in a memory;

a capacitance sensor section for outputting a sensor value expressing a change of a capacitance according to depression of the rotatable operation disk part;

a storage part for storing a reference value corresponding to the sensor value obtained while the rotatable operation disk part is not depressed; and a control part for judging presence/absence of pressing on the rotatable operation disk part based on a vector quantity being a relative value obtained from a difference between the sensor value output from the capacitance sensor section and the reference value stored in the storage part.

In the above-mentioned structure: the storage part stores a predetermined relative value threshold value; and the control part judges that the pressing has been performed when the relative value exceeds the predetermined relative value threshold value.

In the above-mentioned structure: the storage part stores a predetermined absolute value threshold value; and the control part judges that the pressing has been performed when a total sum of sensor values regarding a plurality of directions or a total sum of differences between the sensor values and the reference value exceeds the predetermined absolute value threshold value stored in the storage part even if the pressing is not judged to have been applied because the relative value is equal to or smaller than the predetermined relative value threshold value.

In the above-mentioned structure, the reference value is preferably updated every predetermined period.

In order to attain the above-mentioned object, a reproduction method according to a second aspect of the present invention, which is performed by using a controller including a rotatable operation disk part for performing an input related to reading of data stored in a memory, includes the steps of:

acquiring a sensor value expressing a change of a capacitance according to depression of the rotatable operation disk part;

calculating a vector quantity being a relative value obtained from a difference between a reference value corresponding to the sensor value obtained while the rotatable operation disk part is not depressed and the acquired sensor value; and judging presence/absence of pressing on the rotatable operation disk part based on the calculated relative value.

The above-mentioned method further includes the step of judging whether or not the relative value exceeds a predetermined relative value threshold value, and the pressing is judged to have been performed when the relative value exceeds the predetermined relative value threshold value.

The above-mentioned method further includes the step of judging whether or not a total sum of sensor values regarding a plurality of directions or a total sum of differences between the sensor values and the reference value exceeds a predetermined absolute value threshold value, and the pressing is judged to have been performed when the total sum exceeds the predetermined absolute value threshold value even if the pressing is not judged to have been performed because the relative value is equal to or smaller than the predetermined relative value threshold value.

In the above-mentioned method, the reference value is preferably updated every predetermined period.

According to the present invention, there is provided a reproduction device and a reproduction method in which pressing on a controller performed by an operator can be detected with high accuracy by detecting a change of a capacitance.

BEST MODE FOR CARRYING OUT THE INVENTION

Hereinafter, an embodiment of the present invention is described in detail with reference to the drawings. In the embodiment described below, a reproduction device that can perform a special reproduction such as scratch reproduction of digital audio data recorded on a recording medium is exemplified. Note that the embodiment described below is merely an example and should not be interpreted as a limitation.

Figure 1:
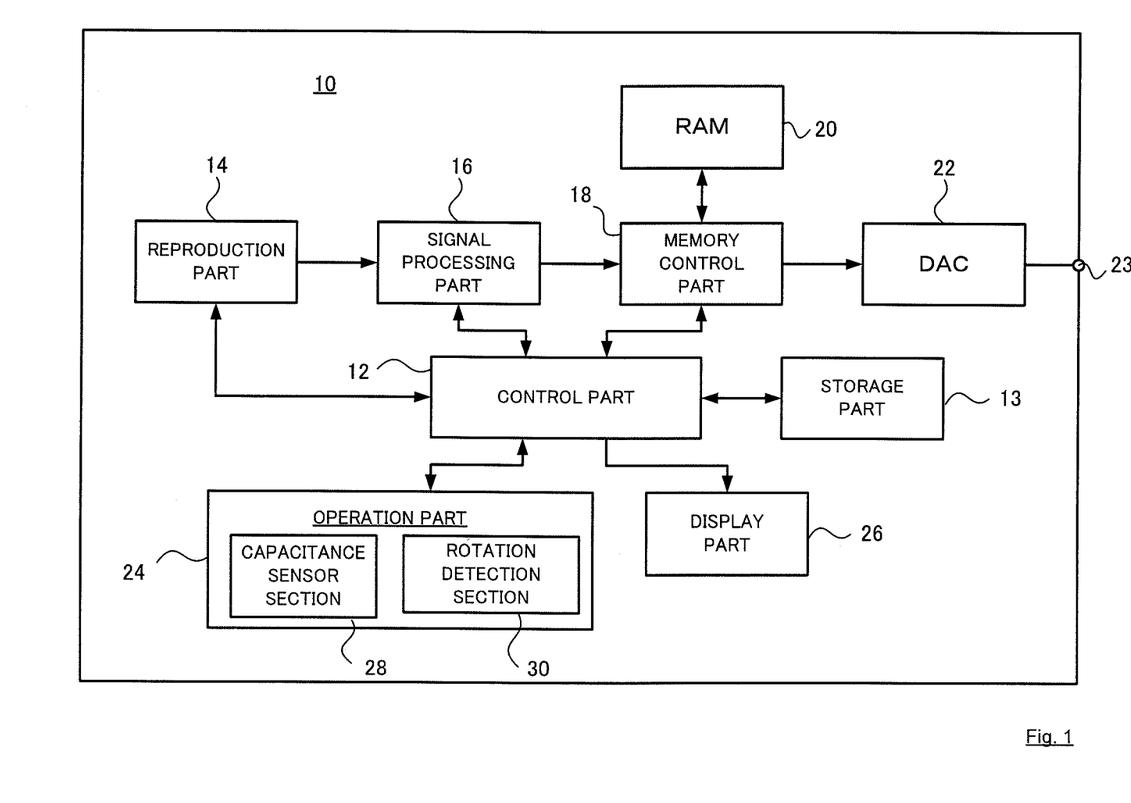
FIG. 1 is a block diagram illustrating a configuration of a reproduction device according to an embodiment of the present invention.

FIG. 1 illustrates a configuration of a reproduction device according to the embodiment of the present invention. A reproduction device 10 illustrated in FIG. 1 includes a control part 12, a reproduction part 14, a signal processing part 16, a memory control part 18, a random access memory (RAM) 20, a digital to analog converter (DAC) 22, an operation part 24, and a display part 26.

The control part 12 generally controls an operation of the reproduction device 10 described below in detail.

The reproduction part 14 reproduces compressed and/or uncompressed digital audio data recorded on the internal or removable recording medium. As the recording medium, there are a compact disk (CD), a digital versatile disk (DVD), a hard disk, a flash memory, and the like. The reproduction part 14 reproduces compressed digital audio data recorded on a recording medium in a unit of track and converts the digital audio data into a predetermined format so as to output the same.

The digital audio data reproduced by the reproduction part 14 is input to the signal processing part 16. The signal processing part 16 performs processes of demodulating the digital audio data, extracting a synchronizing signal, and the like, so as to output the digital audio data to the memory control part 18.

The memory control part 18 performs control to write the input digital audio data in the RAM 20. The RAM 20 stores the input digital audio data. In addition, the memory control part 18 performs control to read from the RAM 20 the digital audio data stored in the RAM 20.

The data read from the RAM 20 is output to the DAC 22. The DAC 22 converts the digital audio data into an analog audio signal. The analog audio signal converted by the DAC 22 is output from an output terminal 23. If the data is output to the device capable of digital input, a predetermined digital format may be used for the output without using the DAC 22.

The display part 26 includes a liquid crystal display device or the like and displays playback time, a track number, and the like of the currently played track.

Figure 2:
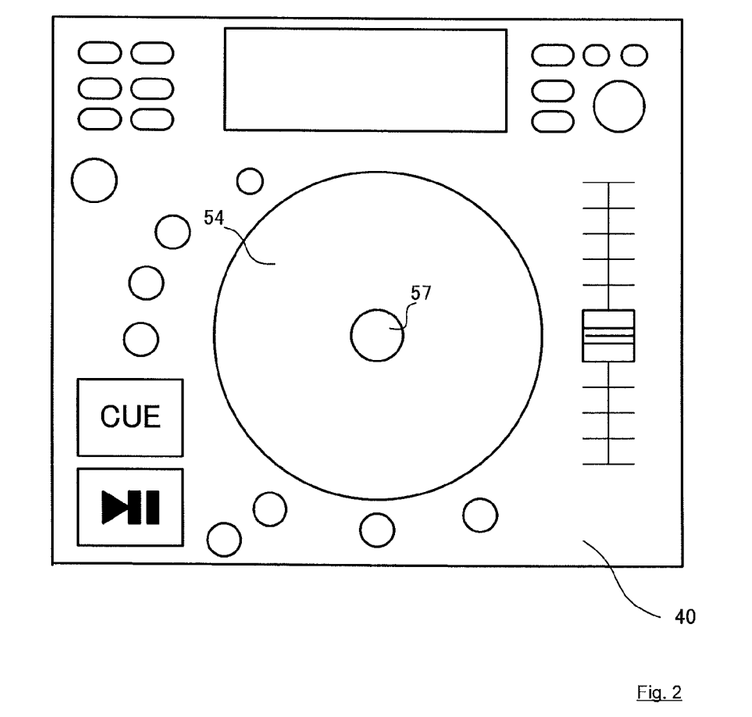
FIG. 2 is a diagram illustrating an example of a structure of an operation panel according to the embodiment of the present invention.

The operation part 24 includes an operation panel provided with a play button, a stop button, and the like as illustrated in FIG. 2, for example, and accepts a command about reproduction control and a command for scratch reproduction or the like from a controller 42 described later.

Returning to FIG. 1, the operation part 24 includes: a capacitance sensor section 28 for detecting presence/absence of pressing on the controller 42 described later performed by an operator based on a change of a capacitance; and a rotation detection section 30 for detecting a rotation operation state of the controller 42.

Figure 3:
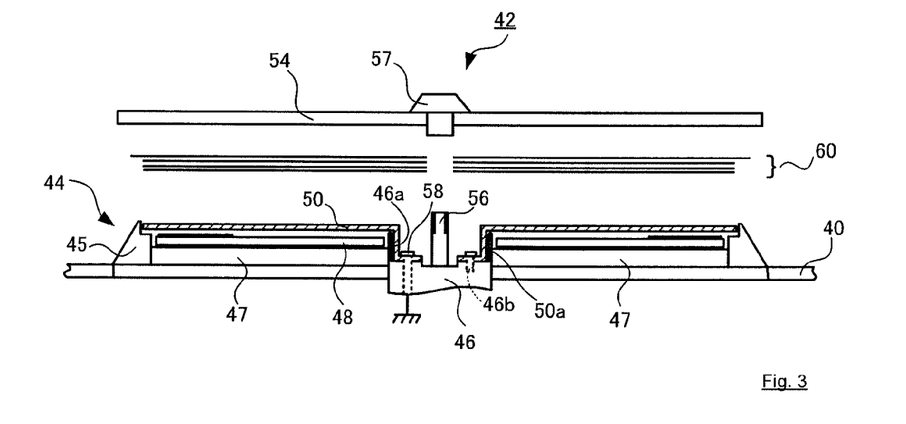
FIG. 3 is a diagram illustrating a partial cross-sectional view of an operation device according to the embodiment of the present invention.

FIG. 3 illustrates a top sectional view of the reproduction device 10 according to this embodiment. The reproduction device 10 illustrated in FIG. 3 has a structure provided with the controller 42 approximately in the center of a top surface of a casing 40 on which an operation panel and the like are formed. The casing 40 is formed of, for example, a plastic material, and exhibits an external appearance having, for example, a cubic shape.

The controller 42 illustrated in the figure includes a mounting table 44, a sensor substrate portion 48, a conductive cover portion 50, an operation disk part 54, and a rotating shaft 56.

The mounting table 44 is structured by a closed-end mesa-shaped member that is located and exposed approximately in the center of the casing 40. The mounting table 44 is formed of an acrylonitrile butadiene styrene (ABS) material or the like. The mounting table 44 includes: a rim portion 45 having an inclination toward its outer edge, which is, for example, 114 mm in inner diameter and 5 mm in height; and a tubular fixed portion 46 provided in the center, which is, for example, 19 mm in inner diameter and 5.7 mm in height. The rim portion 45 and the fixed portion 46 are connected to each other by a plurality of, for example, six beams 47 extending radially from the fixed portion 46, which are, for example, 3 mm in height.

In addition, screwed grooves 46a are formed in the fixed portion 46, and a screw hole 46b is provided in each of the screwed grooves 46a. A screw 58 fastened to one of the screw holes 46b is connected electrically to a grounded sheet metal (not shown) mounted to the casing 40, and set to a ground potential.

The sensor substrate portion 48 is structured by an annular disk-shaped member formed of a paper phenolic or glass epoxy substrate, a copper foil pattern, or the like. The sensor substrate portion 48 is formed to have, for example, an inner diameter of 42 mm and an outer diameter of 102 mm, and located on the beams 47 of the mounting table 44 between the rim portion 45 and the fixed portion 46 with the fixed portion 46 being exposed in an inner side thereof.

Figure 4:
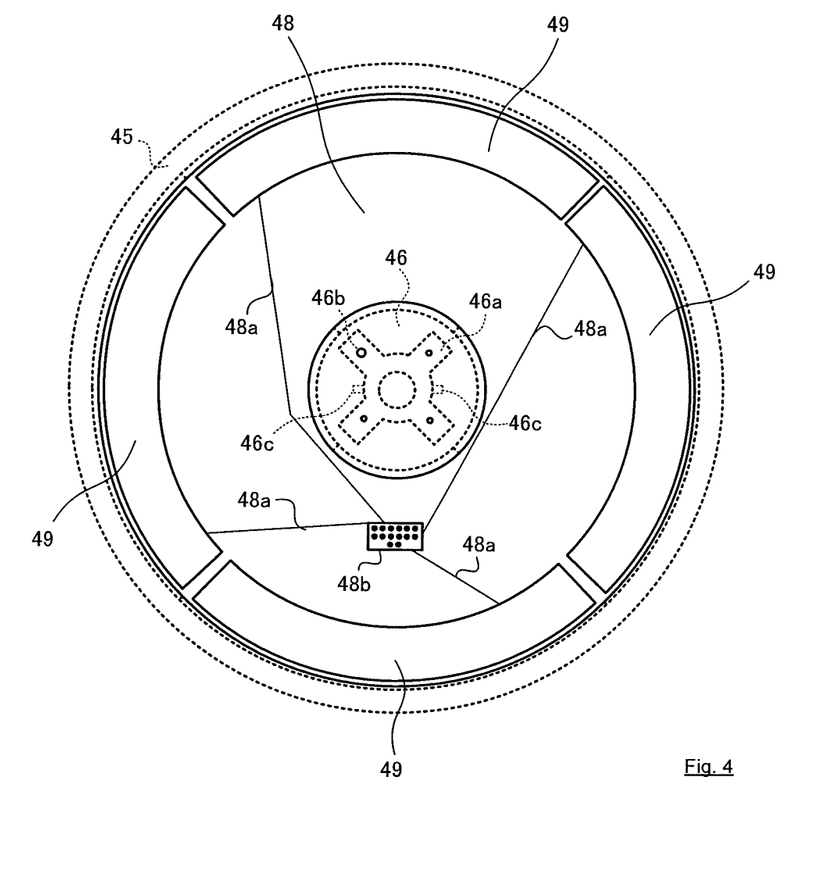
FIG. 4 is a diagram illustrating a top view of a sensor substrate portion according to the embodiment of the present invention.

FIG. 4 illustrates a top view of the sensor substrate portion 48 located on the mounting table 44. As illustrated in FIG. 4, on a top surface of the sensor substrate portion 48, a sensor pattern 49 made of, for example, a copper foil for detection of a capacitance is formed in a belt shape. Four sensor patterns 49 are formed at regular intervals along a circumference of the sensor substrate portion 48. In a case where the operator is present below the sensor substrate portion 48 in FIG. 4, the sensor patterns 49 are located at the top/bottom/left/right from the viewpoint of the operator. The sensor patterns 49 are provided for detecting the pressing on the operation disk part 54 described later performed in a top/bottom/left/right direction by the operator. The sensor patterns 49 are electrically connected to a sensor chip (not shown) via wirings 48a and a solder portion 48b.

The screwed grooves 46a provided to the fixed portion 46 exposed in the inner side of the sensor substrate portion 48 are formed to have substantially a cross shape. Further, two support grooves 46c are formed in the fixed portion 46 so as to be opposed to each other. The support grooves 46c are deeper than the screwed grooves 46a and are formed to have a depth of, for example, 3.7 mm.

Returning to FIG. 3, the conductive cover portion 50 is structured by a thin disk-shaped member formed of a conductive material such as phosphor bronze. An opening is formed in the center of the conductive cover portion 50, and has an inner edge provided with bent portions 50a formed by being bent in an L shape.

Figure 5:
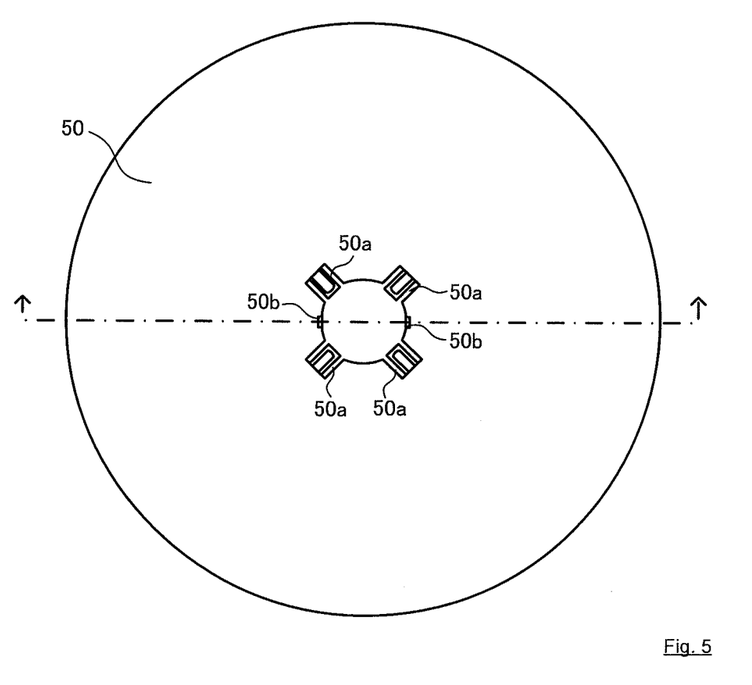
FIG. 5 is a diagram illustrating a conductive cover portion according to the embodiment of the present invention.
Figure 6:
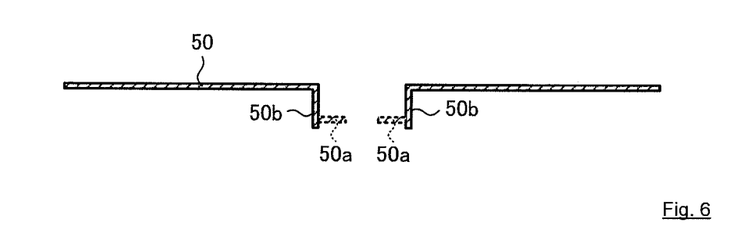
FIG. 6 is a diagram illustrating a sectional view of the conductive cover portion according to the embodiment of the present invention.

FIG. 5 illustrates a top view of the conductive cover portion 50, and FIG. 6 illustrates a sectional view thereof cut along the line in the arrow direction. As illustrated in the figures, four bent portions 50a are formed substantially at regular intervals along the inner edge of the conductive cover portion 50. In addition, two ligulate support portions 50b formed by being bent substantially perpendicularly are provided along the inner edge of the conductive cover portion 50 in positions that are opposed to each other. The support portions 50b are deeper than bottom portions of the bent portions 50a and are formed to have a depth of, for example, 3 mm. Note that the number of the bent portions 50a is not limited to four, and the shape thereof is also set arbitrarily.

With reference to FIG. 3, the conductive cover portion 50 is located above the sensor substrate portion 48 located on the mounting table 44 so as to cover the sensor substrate portion 48. The conductive cover portion 50 is screwed and fixed with the four bent portions 50a and the support portions 50b being fitted into the screwed grooves 46a and the support grooves 46c, respectively.

The conductive cover portion 50 is fixed to the fixed portion 46 so as to be located above the sensor patterns 49 of the sensor substrate portion 48 and so as to be spaced apart by a predetermined distance therefrom. The distance between the conductive cover portion 50 and the sensor patterns 49 is decided based on the height of the support portions 50b. The distance between the sensor patterns 49 and the conductive cover portion 50 is set to, for example, 1 mm. The conductive cover portion 50 is structured so as to deform by, for example, approximately 0.5 mm against a pressing force applied from above.

As described later, the capacitance sensor section 28 detects a capacitance sensed by the sensor pattern 49 based on the pressing on the operation disk part 54. As the larger distance is set between the sensor pattern 49 and the conductive cover portion 50, the larger capacitance change amount sufficient for the detection is secured. However, an up/down operation amount and an operation torque are increased upon the pressing, which deteriorates the operation sensation. Therefore, the distance between the sensor pattern 49 and the conductive cover portion 50 needs to be capable of securing the capacitance change amount for the detection of the pressing without deteriorating the operation sensation.

Here, the support portions 50b function as fulcra on the inner edge side when the conductive cover portion 50 is deformed. Concentrating forces onto the support portions 50b as the fulcra allows the structure to make it difficult to directly apply a force to a screwed portion. Therefore, it is possible to prevent distortion or the like of the conductive cover portion 50 while maintaining the distance between the conductive cover portion 50 and the sensor patterns 49 to be constant to the greatest extent possible.

There is no problem in a case where the conductive cover portion 50 has a small diameter, but as the diameter increases, it is more necessary to adjust the forces applied to the inner edge and secure flatness of a main body of the conductive cover portion 50. The support portions 50b concentrate the forces applied to the inner edge of the conductive cover portion 50 at the time of deformation, thereby contributing to adjustment of the forces. Note that the number of the support portions 50b is not limited to two, and the shape thereof is also set arbitrarily.

One of the screws 58 for screwing the bent portions 50a is connected electrically to the sheet metal (not shown) of the casing 40 via the screwed groove 46a, and the conductive cover portion 50 is set to a ground potential in a screwed state. Therefore, a capacitance according to a relative distance is formed between the conductive cover portion 50 and the sensor patterns 49 of the sensor substrate portion 48.

The sensor patterns 49 has sensor surfaces thereof covered with the conductive cover portion 50 exhibiting the ground potential. This causes the sensor patterns 49 to be shielded by the conductive cover portion 50, and even if a hand of the operator or other such thing close to a ground approaches, there is no change occurring in the detected capacitance amount. Meanwhile, if the conductive cover portion 50 is deformed by the pressing force applied from above, the distance between the conductive cover portion 50 and the sensor patterns 49 is reduced to thereby cause a change of the detected capacitance amount.

The sensor chip (not shown) outputs a sensor value corresponding to the capacitance sensed by the sensor pattern 49 to the control part 12. The sensor patterns 49 and the sensor chip (not shown) constitute the capacitance sensor section 28 according to this embodiment.

The control part 12 receives the sensor value from the capacitance sensor section 28, and judges whether or not the operation disk part 54 described later has been pressed. As described in detail below, the control part 12 finds differences between the sensor value and a predetermined reference value and a threshold value, and performs a pressing judgment processing based on a change in the differences. The reference value and the threshold value used for the processing are stored in the storage part 13.

The operation disk part 54 is located on the conductive cover portion 50, and structured by an annular disk-shaped member formed of a plastic material such as polycarbonate. The operation disk part 54 has an outer diameter of, for example, 120 mm and a thickness of, for example, 1 mm. The sensor substrate portion 48 and the conductive cover portion 50 each have a size set to have a smaller diameter than the size of operation disk part 54.

A mat portion 60 is provided between the operation disk part 54 and the conductive cover portion 50. The mat portion 60 has a smaller outer diameter than the operation disk part 54, and is preferably formed of a plastic material (such as nylon) that rarely causes static electricity with a small coefficient of friction. The operation disk part 54 is caused to rotate on the mat portion 60.

In this example, the mat portion 60 is structured by overlaying a plurality of, for example, four plastic sheets. The sheets do not have to be formed of the same material. For example, a plurality of sheets formed of nylon may be overlaid on both sides of a sheet formed of nylon provided in the center. By thus structuring the mat portion 60 as a plurality of overlaid sheets, it is possible to improve a slip ratio of the operation disk part 54 and to provide the operator with a preferable operation sensation (pressing sensation).

Further, the mat portion 60 has a function as a cushioning material for dispersing and buffering a pressure applied to the conductive cover portion 50. If a force is applied locally to the conductive cover portion 50 formed of a thin plate-like member, deterioration such as distortion is likely to occur, which is prevented by the mat portion 60. The distortion of the conductive cover portion 50 can deteriorate the accuracy of pressing judgment.

The rotating shaft 56 is disposed so as to pass through the sensor substrate portion 48, the mounting table 44, the conductive cover portion 50, and the operation disk part 54 at substantially the center. An end of the rotating shaft 56 is fixed to a cap 57 on the top surface of the operating disk part 54. Therefore, the operating disk part 54 is not detached from the rotating shaft 56 and can rotate over the sensor substrate portion 48 via the mat portion 60.

In addition, the other end of the rotating shaft 56 extends into the casing 40, and is provided with a weight (not shown) and a slit sheet (not shown). The weight includes, for example, an iron disk having a weight of 28 grams and a diameter of about 46 mm. When the operating disk part 54 is rotated by the operator, the weight is also rotated similarly so as to give an inertial force to the rotation of the operating disk part 54. Here, the operating disk part 54 is required to have sufficient rotation performance, for which the smoothness of the mat portion 60 and a bias force of the weight are important factors.

The operating disk part 54 and the mat portion 60 correspond to an analog record disk and a slip mat in an analog record player, respectively. The operator, for example, the disk jockey operates the operating disk part 54 to rotate in an operation feeling similar that in an analog record player, and can perform the scratch reproduction and the like.

In the same manner, a slit sheet (not shown) provided to the other end of the rotating shaft 56 is structured by an annular disk-shaped member formed of a plastic material or the like. The operation disk part 54 and the slit sheet are caused to rotate integrally via the rotating shaft 56. Therefore, when the operation disk part 54 exposed above the top surface of the casing 40 is operated to rotate, the slit sheet is caused to rotate within the casing 40 in a direction corresponding to the rotation of the operation disk part 54 at a rotation speed corresponding thereto. A circumference portion of the slit sheet is provided with a slit (not shown). The slit is formed by, for example, a rectangular-shaped opening portion or a print based on print coating including carbon.

At the vicinity of the outer circumferential part of the slit sheet, the rotation detection section 30 (not shown) for detecting the rotation speed and the rotation direction of the slit sheet is provided to the casing 40. The rotation detection section 30 includes two optical sensors (photo interrupter) and is disposed at positions for detecting a movement of the slit of the rotating slit sheet. When the rotation detection section 30 detects the slit, the rotation detection section 30 generates pulse signals having different phases (having a phase difference of 90 degrees, for example) from the two optical sensors and outputs the signals to the control part 12.

The control part 12 discriminates the rotation direction of the operating disk part 54 based on a phase difference between the input two-phase pulse signals. In addition, the control part 12 discriminates the rotation speed of the operating disk part 54 from the number of pulses of the pulse signal input during a unit time.

Though the optical sensor (photointerrupter) is used for the rotation detection section 30 in this example, it is possible to use another rotation detection section such as a rotary encoder for detecting the rotation state (rotation direction and the rotation speed) of the operating disk part 54.

(Pressing Judgment Processing)

Figure 7:
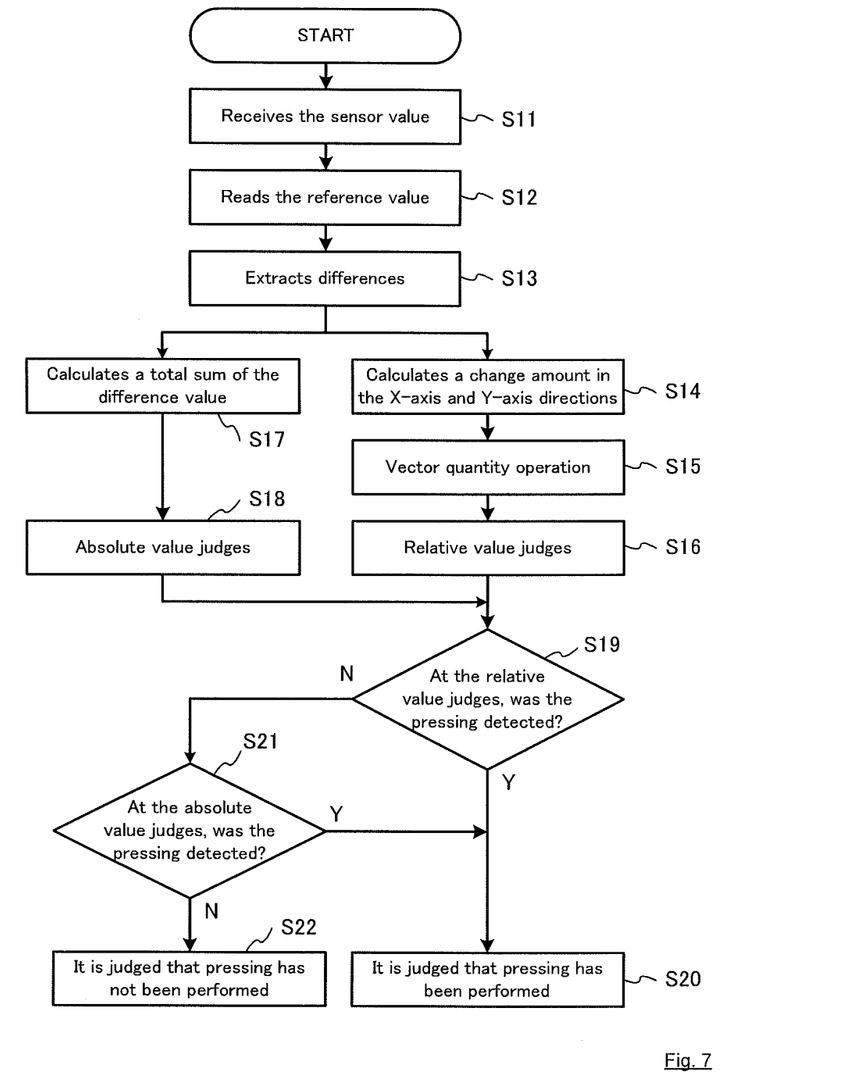
FIG. 7 is a diagram illustrating a flow of pressing judgment processing according to the embodiment of the present invention.

Hereinafter, with reference to the accompanying drawings, detailed description is made of a processing performed by the control part 12 for judging presence/absence of the pressing on the operation part 24 based on the sensor value from the capacitance sensor section 28. FIG. 7 illustrates a processing flow of the pressing judgment.

When power is on, the capacitance sensor section 28 outputs the sensor value of the capacitance on a regular basis, and the control part 12 receives the sensor value (Step S11). The sensor value represents four values regarding the sensor patterns 49 corresponding to the top/bottom/left/right direction viewed from the operator.

Figure 8:
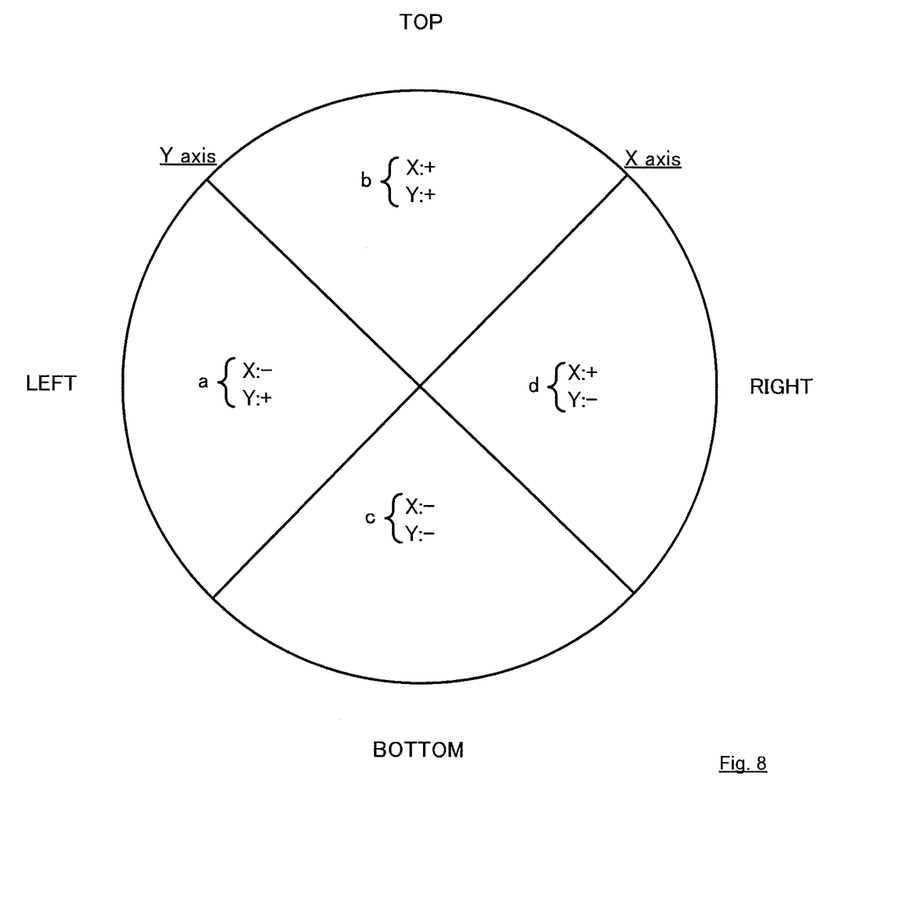
FIG. 8 is a diagram illustrating allocation of sensor patterns according to the embodiment.

This embodiment is described with regard to a case where the four sensor patterns 49 are allocated to ranges illustrated in FIG. 8. In the figure, the ranges (top/bottom/left/right) obtained by dividing a circle within the figure by a central angle of 90 degrees in the case where the operator is present at the bottom of the figure are allocated to the respective sensors. In the figure, a parting line extending from the bottom left to the top right is set as the X axis, a parting line extending from the bottom right to the top left is set as the Y axis, and a contact there between is set as the origin. At this time, the left is expressed as (X,Y)=(−,+), the top is expressed as (X,Y)=(+,+), the right is expressed as (X,Y)=(+,−), and the bottom is expressed as (X,Y)=(−,−). Hereinafter, the sensor values regarding the respective regions are represented by a, b, c, and d, based on which each processing is performed.

Returning to FIG. 7, the control part 12 reads the reference value regarding the respective directions stored in the storage part 13, and extracts differences ($\Delta a$, $\Delta b$, $\Delta c$, $\Delta d$) between the reference value and the acquired sensor values (Steps S12 and S13).

The sensor value represents an actual value reflecting the capacitance which is output from the capacitance sensor section 28. The reference value represents a sensor value set in a state in which the operation disk part 54 is not depressed. Therefore, the difference represents a physical amount expressing how much the operation disk part 54 has been depressed from the undepressed state.

The reference value is updated as the need arises. For example, if the pressing is not detected for a predetermined period in the pressing judgment processing, the control part 12 updates and stores the current sensor value as the reference value. Accordingly, the reference value is corrected against a change in environment.

Subsequently, the control part 12 calculates two change values (relative value and absolute value) based on the extracted difference values. The relative value represents a value obtained by converting the sensor value into a vector quantity, and the absolute value represents a value obtained directly from the sensor value.

First, description is made of calculation of the relative value. The control part 12 calculates a change amount (x,y) in the X-axis and Y-axis directions (Step S14). Here, $x=(\Delta a+\Delta c)-(\Delta b+\Delta d)$ and $y=(\Delta a+\Delta b)-(\Delta c+\Delta d)$. Note that the sensor values (a, b, c, d) may be used without using the differences.

Subsequently, the control part 12 performs a vector quantity operation (Step S15). An angle $\alpha$ in the coordinate axes can be calculated by $\alpha/a \tan(y/x)$, and a vector quantity r can be calculated by $r=|y/\sin \alpha|$. Accordingly, a depressed direction and a magnitude (vector quantity) thereof can be obtained.

After the vector quantity is calculated, the control part 12 reads a relative value threshold value $R_T$ from the storage part 13, compares the relative value threshold value $R_T$ with the obtained vector quantity r, and judges whether or not the vector quantity r exceeds the predetermined relative value threshold value $R_T$ (Step S16). If the vector quantity r exceeds the relative value threshold value $R_T$ ($r > R_T$), the control part 12 judges that the pressing has been performed (Yes in Step S19; Step S20).

The relative value threshold value $R_T$ represents a vector quantity by which the pressing can be detected with sufficiently high sensitivity, and is set empirically. The relative value threshold value $R_T$ is set to a vector quantity based on which it is judged that the depression has been performed when, for example, the depression in one direction is performed.

For example, if the depression in one direction is performed, a vector quantity sufficient for the detection is obtained. However, if depressions are performed simultaneously in the two opposite directions along a diagonal line, the vector quantity sufficient for the detection cannot be obtained because the vectors cancel each other, leading to a fear that the pressing may not be detected. Therefore, the relative value threshold value $R_T$ is set, and if the obtained vector quantity r is equal to or smaller than the relative value threshold value $R_T$, the pressing judgment is further performed by using the absolute value as described later in order to pick up the depressions in a plurality of directions.

The control part 12 calculates a total sum W of the difference values regarding the four directions as the absolute values (Step S17). Here, the total sum W can be expressed by $W=\Delta a+\Delta b+\Delta c+\Delta d$. The total sum W represents a total sum of the change values (pressing amounts) regarding the four directions and a physical amount expressing how much depression is performed as a whole.

Subsequently, the control part 12 reads an absolute value threshold value $W_T$ from the storage part 13, compares the absolute value threshold value $W_T$ with the obtained total sum W, and judges whether or not the total sum W exceeds the absolute value threshold value $W_T$ (Step S18).

Even if it is not judged that the pressing has been performed because the vector quantity r is equal to or smaller than the relative value threshold value $R_T$ ($r \le R_T$; No in Step S19), the control part 12 judges that the pressing has been performed if the total sum W exceeds the absolute value threshold value $W_T$ ($W > W_T$) (Yes in Step S21; Step S20).

Further, if the total sum W is equal to or smaller than the absolute value threshold value ($W \le W_T$), it is judged that the pressing has not been performed (No in Step S21; Step S22).

The absolute value threshold value $W_T$ represents an arbitrary value set empirically. The absolute value threshold value $W_T$ can be defined in association with the relative value threshold value $R_T$, for example, defined a plurality of number of times as large as the relative value threshold value $R_T$. If the relative value threshold value $R_T$ is set to the vector quantity based on which it is judged that the depression has been performed when the depression in one direction is performed, the absolute value threshold value $W_T$ may be set to a value larger than the above-mentioned value ($W_T > R_t$). In this case, it can be regarded that the sufficient pressing has been performed in the four directions as a whole, which enables the detection even if the depressions is performed in a plurality of directions.

Accordingly, the judgment is performed based on the vector quantity (relative value) if the vector quantity sufficient for the judgment can be obtained, for example, if the depression is performed in one direction, while the judgment is performed based on the absolute value even if the sufficient vector quantity cannot be obtained, thereby enabling the detection of the depression continuously with stability.

Here, in a case of performing the pressing judgment by using only the absolute value obtained from the sensor value, a certain amount of variation in sensitivity may be caused among the respective directions. Further, highly accurate detection necessitates highly accurate sheet metal work, which may increase the manufacturing costs. In addition, depending upon the use state, it is possible that a highly accurate structure cannot be maintained. Furthermore, an algorithm becomes complicated because the sensor values regarding the four directions are used, the continuous processings are not performed between a single depression and multiple simultaneous depressions, which can cause an interruption of sound or the like.

In this embodiment, the pressing judgment is performed basically by using the relative value (vector quantity), which prevents the occurrence of such an inconvenience as described above in the case of using the sensor values (absolute values) regarding the four directions. Therefore, the pressing detection can be performed with high accuracy even with a less accurate structure than in the case of using the absolute value, and the manufacturing costs are substantially reduced. Further, the detection of the pressing can be performed continuously with stability during the depression regardless of the single depression and the simultaneous depressions, which enables the reproduction without an unexpected interruption of sound.

(Reproduction Processing)

As described above, the control part 12 receives the sensor value from the capacitance sensor section 28 and performs the pressing judgment. Meanwhile, the control part 12 receives a signal (hereinafter, referred to as "rotation state signal") regarding the rotation state of the operation disk part 54 from the rotation detection section 30. While performing the pressing judgment, the control part 12 controls the reproduction of an audio signal based on the rotation state signal, for example, as described below.

(Normal Reproduction)

The control part 12 reproduces the audio data recorded on the recording medium with a normal speed and order when no pressing is performed and none of the rotation state signal is input.

(Scratch Reproduction)

When pressing is performed and the rotation state signal is input, the control part 12 controls the memory control part 18 so as to read digital audio data from the RAM 20 at a reading speed and in a reading order corresponding to the judged rotation speed and rotation direction of the operation disk part 54. The memory control part 18 controls the reading speed and the reading order (audio data is read in the ascending order or descending order of addresses) of the digital audio data stored in the RAM 20. For instance, when the operating disk part 54 is operated to rotate in a clockwise direction, the control part 12 performs control so as to read the digital audio data stored in the RAM 20 at the reading speed corresponding to the rotation speed thereof in an ascending order of addresses. In addition, when the operating disk part 54 is operated to rotate in a counterclockwise direction, the control part 12 performs control so as to read the digital audio data stored in the RAM 20 at the reading speed corresponding to the rotation speed thereof in a descending order of addresses.

In order to perform the scratch reproduction, the operator presses the operating disk part 54 by hand and rotates the same quickly in the clockwise direction or in the counterclockwise direction when the normal reproduction is performed. When the analog record player is used for performing the scratch reproduction, the operator usually performs rotating operation of the analog record while pressing the same so that the analog record is quickly rotated against the rotation of the turntable. Therefore, if the operator operates the operating disk part 54 with an operation feeling similar to that of the analog record, the operating disk part 54 is rotated while it is pressed downward.

When the operator performs a rotation operation while depressing the operation disk part 54, the operation disk part 54 and the conductive cover portion 50 are deformed downward due to the pressing force. At this time, there is a change of the capacitance, the capacitance sensor section 28 output, a sensor value corresponding to the change to the control part 12. Further, upon detection of a rotating slit, the rotation detection section 30 generates a rotation state signal (pulse signal described above) and outputs the rotation state signal to the control part 12.

As described above, the control part 12 judges presence/absence of the pressing, based on the sensor value. When the pressing is performed and the rotation state signal is input, the control part 12 controls the memory control part 18 so as to read the digital audio data from the RAM 20 at a reading speed and in a reading order corresponding to the rotation speed and rotation direction, which is judged based on the rotation state signal, of the operating disk part 54.

When the operator takes his/her hand off the operation disk part 54 and ends the scratch reproduction, the operation disk part 54 and the conductive cover portion 50 return to the state before the pressing due to the resilience. At this time, based on the sensor value from the capacitance sensor section 28, the control part 12 judges that the pressing has not been performed. When no pressing is performed even if the rotation state signal is input from the rotation detection section 30, the control part 12 causes the memory control part 18 to perform control for reading the digital audio data from the RAM 20 at a reading speed used at the time of the normal reproduction. Accordingly, when no pressing is performed even if the rotation state signal generated while the operation disk part 54 keeps rotating due to inertia is input to the control part 12, it is possible to return from the scratch reproduction to the normal reproduction.

As described above, the controller 42 according to the above-mentioned embodiment includes the capacitance sensor section 28 for detecting the pressing on the controller 42 by the operator based on a variation in capacitance. Here, the sensor patterns 49 constituting the capacitance sensor section 28 are covered with the conductive cover portion 50 that is set to be the ground potential.

Therefore, it is possible to detect only the variation in the capacitance between the conductive cover portion 50 and the sensor patterns 49 without being affected by the capacitance value between the operator and the sensor patterns 49. In other words, the sensor patterns 49 are shielded by the conductive cover portion 50. Therefore, even if a hand of the operator or other such thing close to a ground approaches the sensor, the capacitance does not change until the operating disk part 54 is actually pressed so that a minute physical change occurs. Therefore, a detection error when the pressing is not performed can be substantially avoided.

In addition, because there is adopted a structure in which the pressing on the controller 42 is detected from the capacitance change, a problem such as age deterioration due to physical contacts can be substantially avoided or relieved unlike the structure in which a switch is used for detecting the pressing. In addition, a difference of operation feeling depending on a location of the switch or a difference of click feeling does not occur. Further, because the pressing detection means can be disposed inside the controller 42, restriction to the general design of the reproduction device 10 is decreased, cost of a die or the like can be reduced, and repair such as exchange of the sensor can be facilitated.

In the structure, the thin plate-like conductive cover portion 50 is used, has the bent portions 50a formed along its inner edge, is screwed and fixed to the fixed portion 46 exposed in the inner side, and is supported by the support portions 50b. According to this structure, it is possible to use the conductive cover portion 50 having a relatively large diameter.

Further, grounding is performed via the screws 58 for screwing the bent portions 50a, and hence the step of forming a ground pattern, the step of soldering, or other such step is unnecessary, which allows the manufacturing with substantially a small number of steps, thereby making it possible to reduce the costs.

Further, in the pressing judgment processing, the judgment is performed basically by using the relative value (vector quantity) obtained from the sensor value of the capacitance, and if the pressing is not judged, the judgment is further performed by using the absolute value (total sum of the pressing amounts regarding all the directions).

By first performing judgment by using the relative value as described above, the pressing discrimination with high accuracy becomes possible with relatively low structure accuracy, and the detection can be performed continuously with stability regardless of the single depression and the simultaneous depressions. Further, even if the vector quantity obtained by the simultaneous depressions is not sufficient for the detection, the depressions can be picked up by performing the judgment by using the absolute value.

As described above, according to the above-mentioned embodiment, it is possible to provide the controller 42 and the reproduction device that can substantially improve the operability by using the capacitance sensor for detecting the pressing on the controller 42 while eliminating influence on the capacitance from approaching of human body or external noise, to thereby detect only the pressing by the operator.

The present invention is not limited to the embodiment described above, and can be modified or corrected variously.

For example, in the embodiment described above, although the reproduction device 10 is configured so that the reproduction part 14 for reproducing data recorded on the recording medium is provided, the reproduction device 10 may not have the reproduction part 14 but may process data input from an external reproducing means.

Further, the above-mentioned embodiment is configured so that the control part 12 receives the sensor value from the capacitance sensor section 28 and judges the pressing. However, a microcomputer dedicated to the pressing judgment may be provided separately from the control part 12, and may be configured to perform the pressing judgment and send the results to the control part 12.

In addition, in the above-mentioned embodiment, the example in which only the audio data is reproduced is described. However, the present invention is not limited thereto, and audio data and video data may be reproduced.

Japanese Patent Application No. 2008-82380 (filed on Mar. 27, 2008), including specifications, claims, drawings, and abstract, is entirely incorporated by reference into this application.

INDUSTRIAL APPLICABILITY

According to the present invention, it is possible to provide reproducing technology capable of detecting a capacitance variation so as to detect the pressing on the controller performed by the operator with high accuracy, and hence the present invention has very wide industrial availability.

The invention claimed is:

1. A reproduction device, comprising:
a rotatable operation disk part, structured by an annular disk-shaped member, for performing an input related to reading of data stored in a memory;
a capacitance sensor section configured to output a sensor value expressing a change of a capacitance according to depression of the rotatable operation disk part, wherein the capacitance sensor section contains at least one sensor pattern;
a storage part configured to store and update a reference value corresponding to the sensor value obtained while the rotatable operation disk part is not depressed; and
a control part configured to judge presence/absence of pressing on the rotatable operation disk part, wherein the control part calculates a relative value change and an absolute value change, each change based on a difference between the reference value previously stored in the storage part and the outputted sensor value, wherein the relative value represents a value obtained by converting the sensor value into a vector quantity and the absolute value represents a value obtained directly from the sensor value.

2. A reproduction device according to claim 1, wherein:
the storage part stores a predetermined relative value threshold value; and
the control part judges that the pressing has been performed when the relative value exceeds the predetermined relative value threshold value.

3. A reproduction device according to claim 2, wherein:
the storage part stores a predetermined absolute value threshold value; and
the control part judges that the pressing has been performed when a total sum of sensor values regarding a plurality of directions or a total sum of differences between the sensor values and the reference value exceeds the predetermined absolute value threshold value stored in the storage part even if the pressing is not judged to have been performed because the relative value is equal to or smaller than the predetermined relative value threshold value.

4. A reproduction device according to claim 1, wherein the reference value is updated every predetermined period.

5. A reproduction method performed by using a controller comprising a rotatable operation disk part for performing an input related to reading of data stored in a memory, the reproduction method comprising the steps of:
acquiring a sensor value expressing a change of a capacitance according to depression of the rotatable operation disk part;
calculating a relative value change and an absolute value change, each change based on a difference between a reference value corresponding to the sensor value obtained while the rotatable operation disk part is not depressed, wherein the reference value is previously stored, and the acquired sensor value, wherein the relative value represents a value obtained by converting the sensor value into a vector quality and the absolute value represents a value obtained directly from the sensor value;
judging presence/absence of pressing on the rotatable operation disk part based on the calculated relative value; and
updating the reference value.

6. A reproduction method according to claim 5, further comprising the step of judging whether or not the relative value exceeds a predetermined relative value threshold value, wherein the pressing is judged to have been performed when the relative value exceeds the predetermined relative value threshold value.

7. A reproduction method according to claim 6, further comprising the step of judging whether or not a total sum of sensor values regarding a plurality of directions or a total sum of differences between the sensor values and the reference value exceeds a predetermined absolute value threshold value, wherein the pressing is judged to have been performed when the total sum exceeds the predetermined absolute value threshold value even if the pressing is not judged to have been performed because the relative value is equal to or smaller than the predetermined relative value threshold value.

8. A reproduction method according to claim 5, wherein the reference value is updated every predetermined period.

9. A reproduction device according to claim 2, wherein the reference value is updated every predetermined period.

10. A reproduction device according to claim 3, wherein the reference value is updated every predetermined period.

11. A reproduction method according to claim 6, wherein the reference value is updated every predetermined period.

12. A reproduction method according to claim 7, wherein the reference value is updated every predetermined period.

* * * * *